United States Patent [19]

Shibata et al.

[11] Patent Number: 4,750,796

[45] Date of Patent: Jun. 14, 1988

[54] OPTICAL SENSOR

[75] Inventors: Yutaka Shibata; Akira Nishimura; Shin-ichiro Niwa; Yoshitaka Osawa; Takafumi Uemiya, all of Osaka, Japan

[73] Assignee: Sumitomo Electric Industries, Ltd., Osaka, Japan

[21] Appl. No.: 868,683

[22] Filed: May 30, 1986

[30] Foreign Application Priority Data

May 31, 1985 [JP] Japan ................... 60-119576

[51] Int. Cl.$^4$ ............ G02B 6/16; G02B 6/26; H01J 5/16
[52] U.S. Cl. ............ 350/96.29; 350/96.15; 250/227
[58] Field of Search ............ 350/96.15, 96.29; 250/227

[56] References Cited

U.S. PATENT DOCUMENTS

| 4,212,514 | 7/1980 | Prunier et al. ............ 350/96.15 X |
| 4,386,269 | 5/1983 | Murphy ............ 250/227 |
| 4,421,979 | 12/1983 | Asawa et al. ............ 250/227 |

FOREIGN PATENT DOCUMENTS 0121787 9/1979 Japan ............ 350/96.15

OTHER PUBLICATIONS

"IBM Technical Disclosure Bulletin", by Kaser et al., vol. 16, No. 18, Jan. 1974.

Primary Examiner—William L. Sikes
Assistant Examiner—Akm E. Ullah
Attorney, Agent, or Firm—Cushman, Darby & Cushman

[57] ABSTRACT

An optical sensor which comprises an optical waveguide comprising a cladding and an optical waveguide member made of a transparent elastomer which is surrounded by the cladding and through which light is propagated, wherein an amount of light to be propagated through the waveguide member is changed according to a degree of elastic deformation of the waveguide member, which is not affected by electrical and/or magnetic fields.

8 Claims, 5 Drawing Sheets

Fig. 1A
Fig. 1B
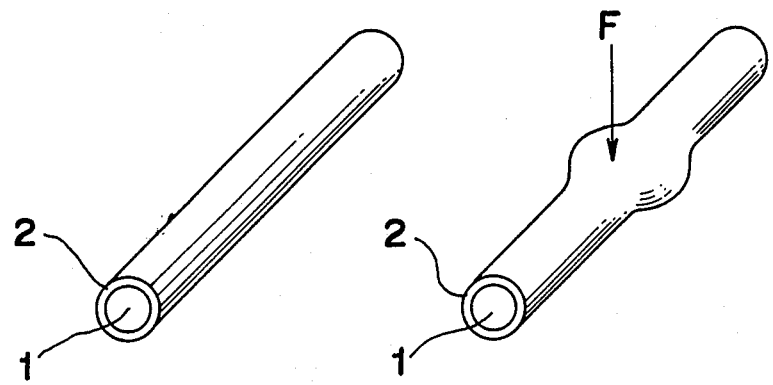
Fig. 2
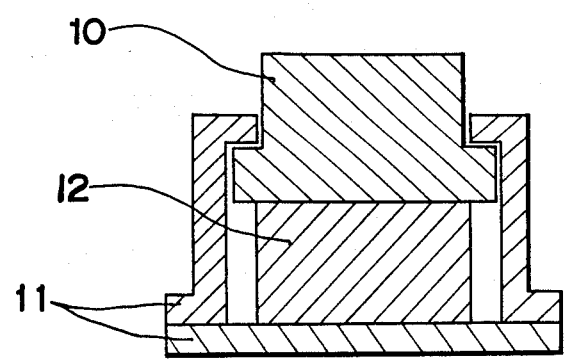

OPTICAL SENSOR

FIELD OF THE INVENTION

The present invention relates to an optical sensor comprising an optical waveguide. More particularly, it relates to an optical sensor comprising an elastically deformable optical waveguide.

BACKGROUND OF THE INVENTION

Conventional sensors which may be electrical or mechanical have their own drawbacks and are not satisfactory. For example, the electrical sensor suffers from electromagnetic interference and is not essentially explosive-proof. The mechanical sensor not only has complicated structures but also suffers from friction associated with the moving parts.

SUMMARY OF THE INVENTION

One object of the present invention is to provide a sensor which does not have the drawbacks of the conventional sensors.

Another object of the present invention is to provide a novel optical sensor.

Further object of the present invention is to provide a sensor which utilizes elastic deformation of an elastomeric material.

These and other objects are accomplished by a sensor of the present invention, which comprises an optical waveguide comprising a cladding and an optical waveguide member or core made of a transparent elastomer which is surrounded buy the cladding and through which light is propagated, wherein an amount of light to be propagated through the waveguide member is changed according to a the degree f elastic deformation of the waveguide member.

BRIEF DESCRIPTION OF THE DRAWINGS

FIGS. 1A and 1B illustrate a principle of the sensor according to the present invention.

FIG. 2 is a cross sectional view of one embodiment with a press button,

DETAILED DESCRIPTION OF THE INVENTION

Figure 3A:
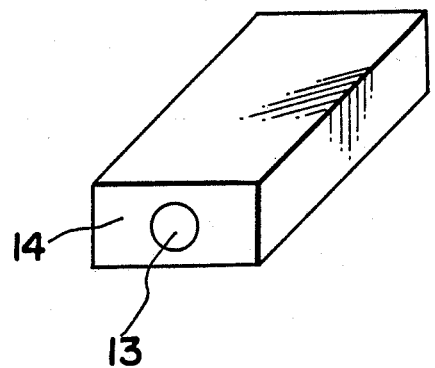
FIGS. 3A to 3D are perspective views of the sensor elements according to the present invention.

The optical waveguide member of the sensor according to the present invention is elastically deformed by application of external load whereby an amount of light propagated therethrough is changed. The load may be applied to a part of the waveguide or to the whole waveguide. When the load is removed, the waveguide elastically recovers to its original shape so that it can be repeatedly used.

The waveguide member of the optical waveguide used according to the present invention is made of a transparent elastomer. Specific examples of the transparent elastomer are polysiloxane elastomer (silicone rubber), polyurethane rubber and polybutadiene rubber. Among them, polysiloxane elastomer is preferred because it has better transparency. According to the present invention, any rigid material such as silica glass, multi-component glass, ceramics and rigid plastics (e.g. polymethyl methacryalte) is not suitable for making the waveguide member.

The optical waveguide used according to the present invention may be an elongated one, and its cross section may be round, square, rectangular or any other shape. The optical waveguide may have a flattened cross section.

The optical waveguide usually comprises a cladding which reflects light propagated through the waveguide member around at least a part of and preferably all of the periphery of the waveguide member. The cladding may be substituted by any means which can reflect light and prevent leakage of the propagated light.

The cladding should have mechanical strength so that the optical waveguide is elastically deformed but the cladding itself is not destroyed. Preferably, the cladding serves to protect the sensor. In case of an optical fiber comprising a core and a cladding, the core corresponds to the waveguide member.

The cladding is made of any material which can reflects light propagated through the waveguide member. Specific examples of the cladding materials are fluororubbers, silicone rubbers, fluororesins (e.g. tetrafluoroethylene/hexafluoropropylene copolymer, polytetrafluoroethylene and the like), polyurethane rubbers, polybutadiene rubbers, and so on.

Usually, the cladding is made of an elastomer having a smaller refractive index than that of the waveguide member (e.g. fluorine-containing elastomer), although other material such as plastics may be used. Preferably, the cladding material is transparent.

Now, the present invention is illustrated with reference to the attached drawings by way of example.

FIGS. 1A and 1B illustrate a principle of the sensor according to the present invention. In these figures, the optical waveguide is an optical fiber and the elastic deformation is compression deformation. The sensor of Figs. 1A and 1B comprises a waveguide member 1 and a cladding 2 surrounding the waveguide member 1. Light is propagated from one end of the optical fiber to another. When a load is applied to a part of the sensor in a direction shown by an arrow F, the sensor is flattened as shown in FIG. 1B so that the amount of light emitted is descreased in comparison with the unflattened state of FIG. 1A. The amount of emitted light is changed once the load is applied to any part of the waveguide along its length. The sensor of the present invention recovers its original shape of FIG. 1A after the load F is removed. therefore, it can be repeatedly used.

Various embodiments of the sensor of the present invention will be explained, which do not limit the scope of the present invention. In the following figures, only a part of the sensor is shown, but optical fibers for incident light and emitted light and spliced parts are not shown for simplicity.

1. Pressure-sensitive sensor (utilizing compression deformation)

The pressure-sensitive sensor of this embodiment utilizes compression deformation. This embodiment is illustrated by making reference to a press button.

FIG. 2 is a cross section of a press button, which comprises a button means 10, a casing 11 and a sensor element 12. FIGS. 3A to 3D are perspective views of the several sensor elements. In each of these figures, light may be propagated from the front end to the rear end of the sensor element.

Figure 3B:
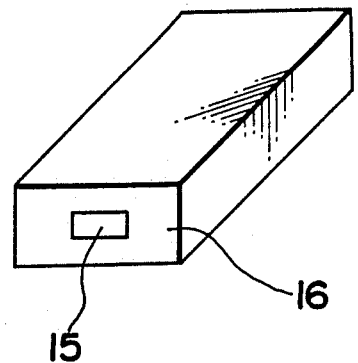

FIG. 3A is a perspective view of a sensor element comprising a round optical waveguide member 13 and a cladding 14. FIG. 3B is a perspective view of a sensor element comprising a square optical waveguide member 15 and a cladding 16. In FIGS. 3A and 3B, the waveguide members 13 and 15 are extended from the front end to the rear end of the sensor element in the figures. The cladding 14 or 16 has a smaller refractive index that that of the waveguide member 13 or 15 and may be made of an elastomeric material. It may serve as a protective layer. Elasticity of the cladding helps the restoration of the press button to its original position. The cross sections of the waveguide member in FIGS. 3A and 3B are round and square, although the may be other shapes.

Figure 3C:
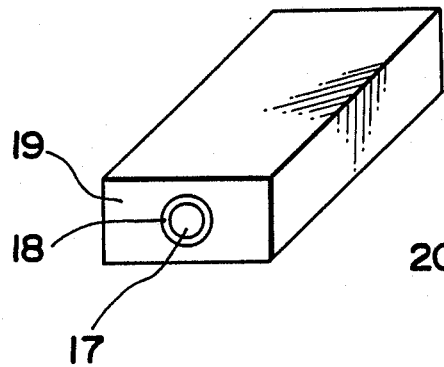

FIG. 3C is a perspective view of a sensor element comprising an optical waveguide member 17, a cladding 18 and a protective layer 19 surrounding the cladding 19. The cladding may be a tube made of an elastomer or a plastic. The waveguide member and the cladding may form an optical fiber.

Figure 3D:
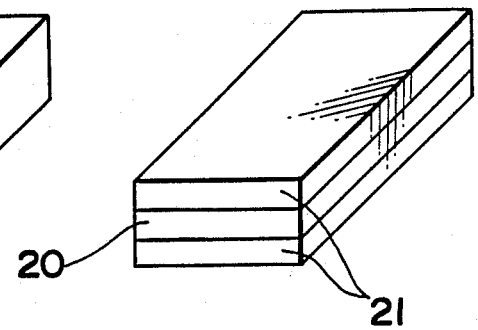

FIG. 3D is a perspective view of a sensor element comprising a sheet form optical waveguide member 20 and a pair of sheet form claddings 21 which sandwich the waveguide member 20. The cladding may by a plastic film. This sensor element may further comprise an elastomeric cushioning layer on at least one of the claddings.

Figure 4:
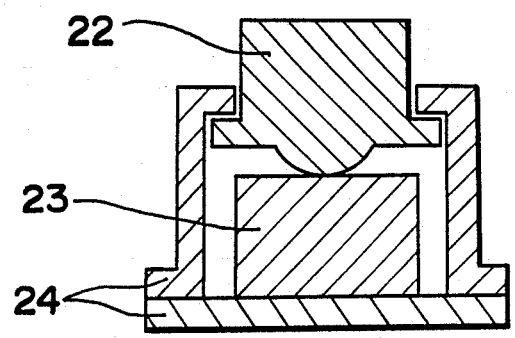
FIG. 4 is a cross sectional view of another embodiment with a press button.

FIG. 4 is a cross sectional view of a press button comprising a button member 22, the sensor element 23 shown in FIG. 3D and a housing 24 containing the button means 22 and the sensor element 23. An upper portion of the sensor element 23 is pressed by a lower protrusion of the button means 23.

2. Pressure sensitive sensor (utilizing flexural deformation)

Figure 5A:
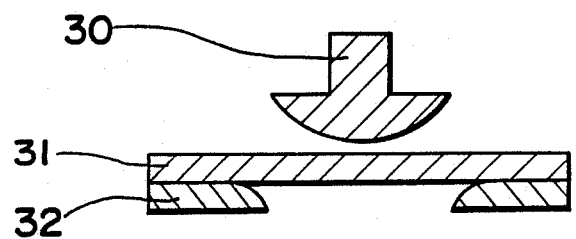
FIGS. 5A and 5B are schematic cross sectional view of a pressure sensitive sensor utilizing flexural deformation.
Figure 5B:
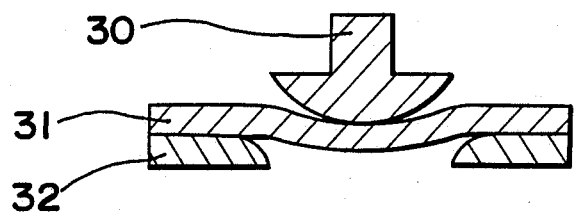

A pressure sensitive sensor utilizing flexural deformation is shown in FIGS. 5A and 5B. Such sensor may be used as a press button. FIGS. 5A and 5B schematically show cross sectional views of the sensor before and during applying a load, respectively. The pressure sensitive sensor comprises a button means 30, a sensor element 31 and a support 32. The sensor element 31 may be any of those shown in FIGS. 3A to 3D. Light is propagated from one side of the sensor element 31 to another.

3. Strain gauge

This gauge measures changes in the amount of light propagated through the optical waveguide due to an change of the cross sectional area and the length caused mainly by tensile load (not shown).

4. Load-sensing transducer

The sensor elements of FIGS. 3A to 3D can be used as a part of a load-sensing transducer (not shown).

5. Linear switch

Figure 6:
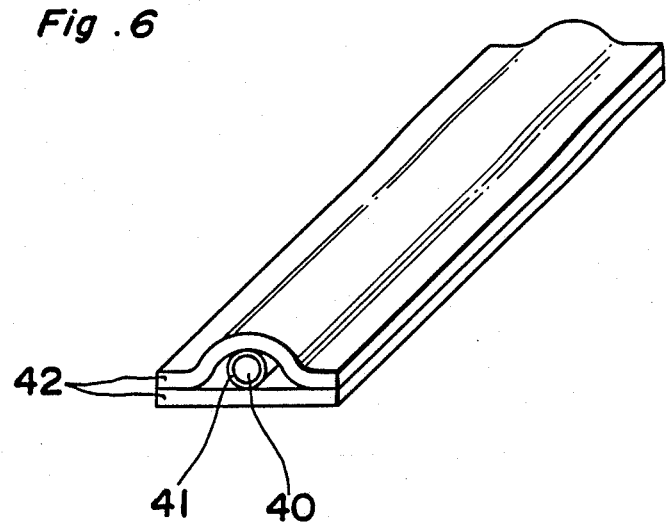
FIG. 6 is a perspective view of a liner switch.

FIG. 6 is a perspective view of a linear switch, which comprises an optical waveguide member 40, a cladding 41 and a pair of coverings 42. The optical waveguide member is made of an elastomer, the cladding is made of an elastomer or a plastic, and the coverings are made of a plastic sheet. The upper and lower covering sheet may be heat sealed. When load is applied to at least a part along its length, the amount of the emitted light is changed. When the linear switch is attached at one end of a sliding door, it can detect a material trapped between the door and its frame.

6. Membrane switch

Figure 7:
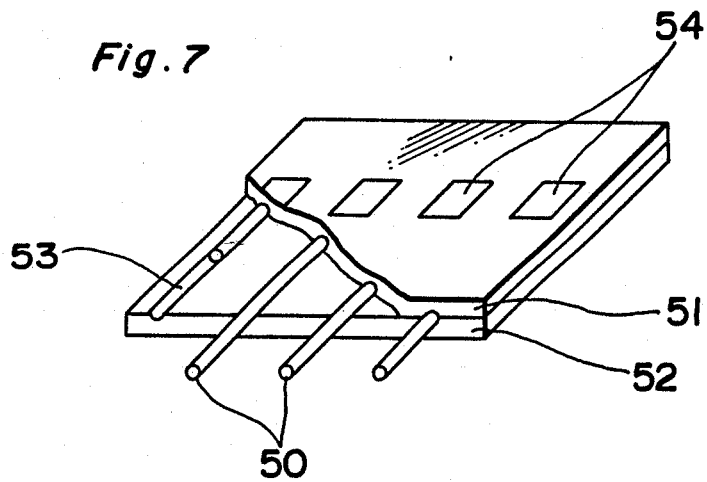
FIG. 7 is a perspective view of one embodiment of a membrane switch.

FIG. 7 is a partly removed perspective view of a membrane switch, which comprises an optical waveguide member 50, a panel 51 and a base plate 52. The panel 51 is an elastomer sheet and the base plate is a plastic or elastomer sheet. On the inner surfaces of the panel 51 and the base plate 52, several grooves 53 are provided with, and in the grooves, the waveguides are embedded. On the upper surface of the panel, there are provided indicating marks 54 by, for example, printing.

Figure 8:
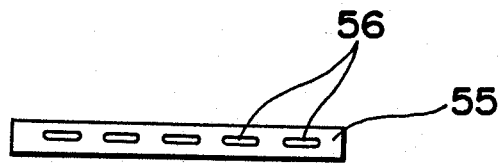
FIG. 8 is a cross sectional view of another embodiment of a membrane switch.

FIG. 8 is a cross sectional view of another embodiment of the membrane switch, which comprises a matrix member 55 and optical waveguide members 56. The matrix member 55 acts as a cladding.

Since the sensor of the present invention utilizes light as a medium to be changed by the external load, it is not affected by electric and/or magnetic fields. The sensor of the invention elastically functions so that it has good durability. The sensor of the invention has a simple structure and no contacting point. By adjusting the elasticity of the elastomer, it is possible to gently operate the press button. Further, a very thin membrane switch can be produced.

Practically and presently preferred embodiments of the sensor of the present invention will be shown by the following examples.

EXAMPLE 1

Figure 9:
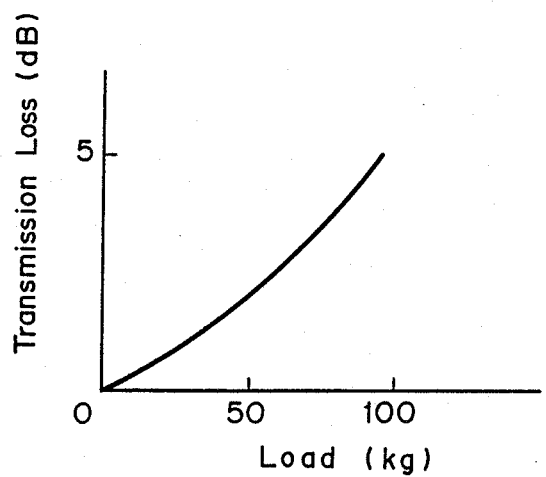
FIGS. 9 and 10 are graphs showing relationships between the light transmission loss and load applied.

An elongated cylindrical sensor comprising an optical waveguide member made of polysiloxane elastomer having a diameter of 2 mm and a cladding made of tetrafluoroethylene/hexafluoropropylene copolymer having an outer diameter of 3 mm was fabricated. Over a length of 50 mm of the sensor, load was applied and a light transmission loss was measured. The relationship between the load applied and the light transmission loss is shown in FIG. 9. After the load was repeatedly applied and removed, substantially the same results were obtained. From FIG. 9, it is understood that there is a good correlation between the load and the light transmission loss.

EXAMPLE 2

Figure 10:
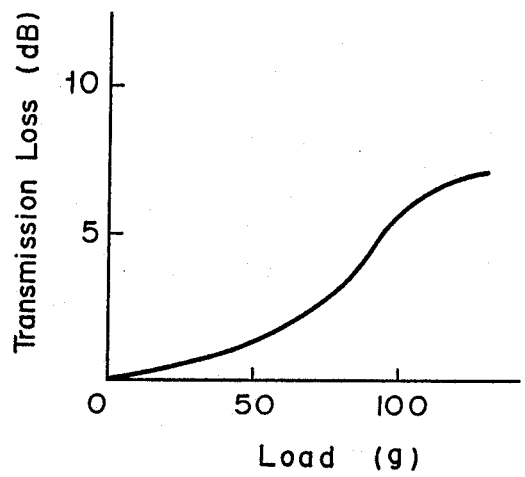

An elongated cylindrical sensor comprisng an optical waveguide member made of polysiloxane elastomer having a diameter of 1.8 mm and a cladding made of a fluororubber having an outer diameter of 2 mm was fabricated. Over a length of 10 mm of the sensor, load was applied and a light transmission loss was measured. The relationship between the load applied and the light transmission loss is shown in FIG. 10. After the load was repeatedly applied and removed, substantially the same results were obtained. From FIG. 10 it is understood that there is good correlation between the load and the light transmission loss.

What is claimed is:

1. An optical sensor which comprises an optical waveguide comprising a cladding and an optical waveguide member made of a transparent elastomer which is surrounded by the cladding and through which light is propagated, wherein an amount of light to be propagated through the waveguide member is changed according to a degree of elastic deformation of the waveguide member.

2. The optical sensor according to claim 1, which is elastically deformed by applying load to at least a part of the optical waveguide.

3. The optical sensor according to claim 1, wherein the cladding is made of an elastomer.

4. The optical sensor according to claim 3, wherein the cladding is made of a fluoroelastomer.

5. The optical sensor according to claim 1, wherein the waveguide member is made of a transparent elastomer selected from the group consisting of polysiloxane elastomer, polyurethane and polybutadiene rubber.

6. The optical sensor according to claim 5, wherein the waveguide member is made of polysiloxane elastomer.

7. The optical sensor according to claim 1, wherein the cross section of the waveguide is round, square or rectangular.

8. The optical sensor according to claim 1, wherein the waveguide has a flattened cross section.

* * * * *